Oct. 30, 1923.

H. T. THOMAS 1,472,285

TRANSMISSION GEARING FOR AUTOMOBILES

Filed May 9, 1921     2 Sheets-Sheet 1

INVENTOR.
HORACE T. THOMAS.
BY Ralymond A. Parker
ATTORNEY.

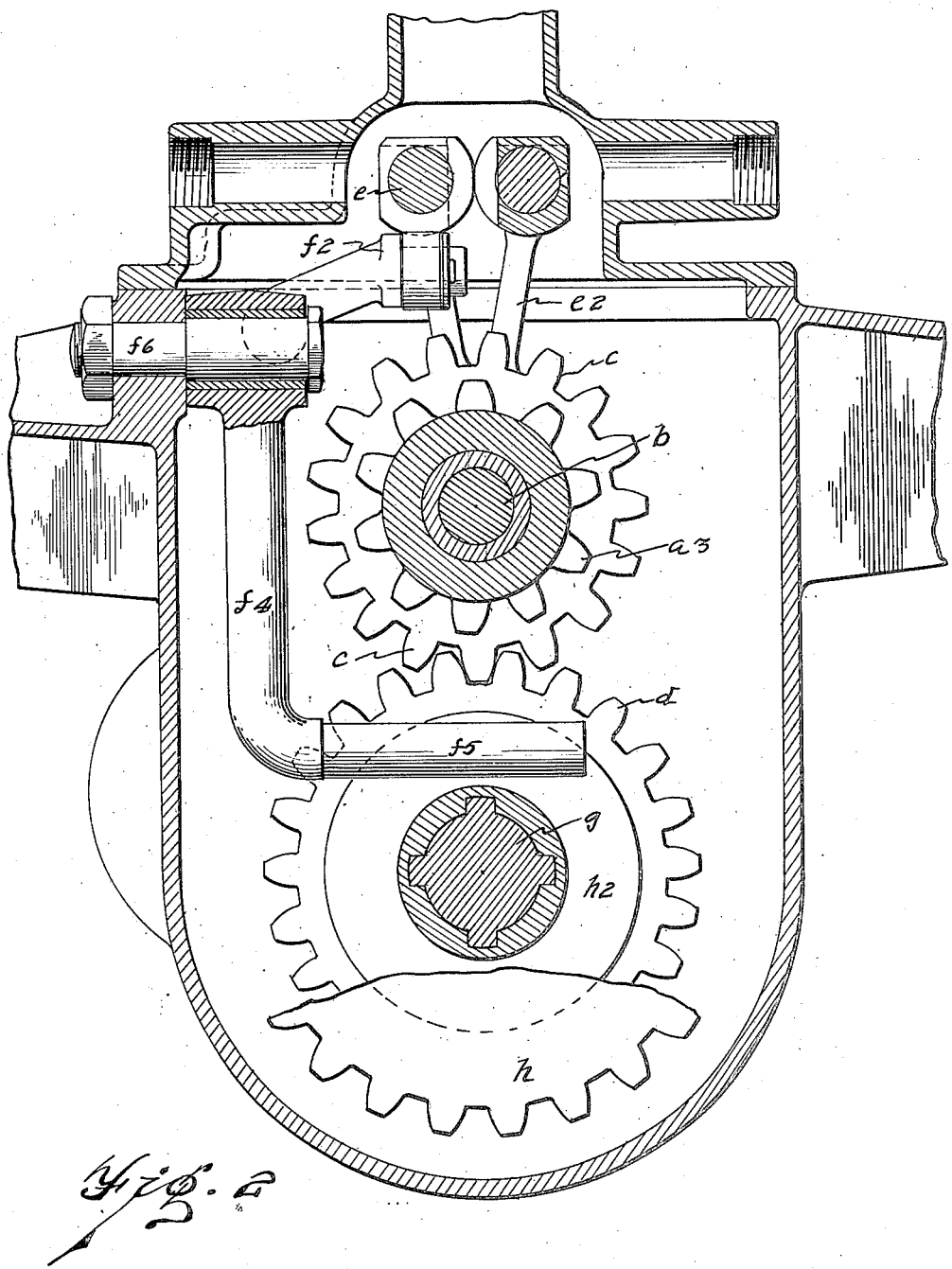

Patented Oct. 30, 1923.

1,472,285

UNITED STATES PATENT OFFICE.

HORACE T. THOMAS, OF LANSING, MICHIGAN.

TRANSMISSION GEARING FOR AUTOMOBILES.

Application filed May 9, 1921. Serial No. 468,071.

*To all whom it may concern:*

Be it known that I, HORACE T. THOMAS, citizen of the United States, residing at Lansing, county of Ingham, State of Michigan, have invented a certain new and useful Improvement in Transmission Gearing for Automobiles, and declare the following to be a full, clear, and exact description of the same, such as will enable others skilled in the art to which it pertains to make and use the same, reference being had to the accompanying drawings, which form a part of this specification.

My invention relates to transmission gearing for automobiles, and an object of my improvements is to provide an improved apparatus in which no gearing will be in operative engagement when the direct connection is made.

In the accompanying drawings:

Figure 2 is a section on the line 2—2, Figure 1, looking in the direction of the arrows.

Figure 1:
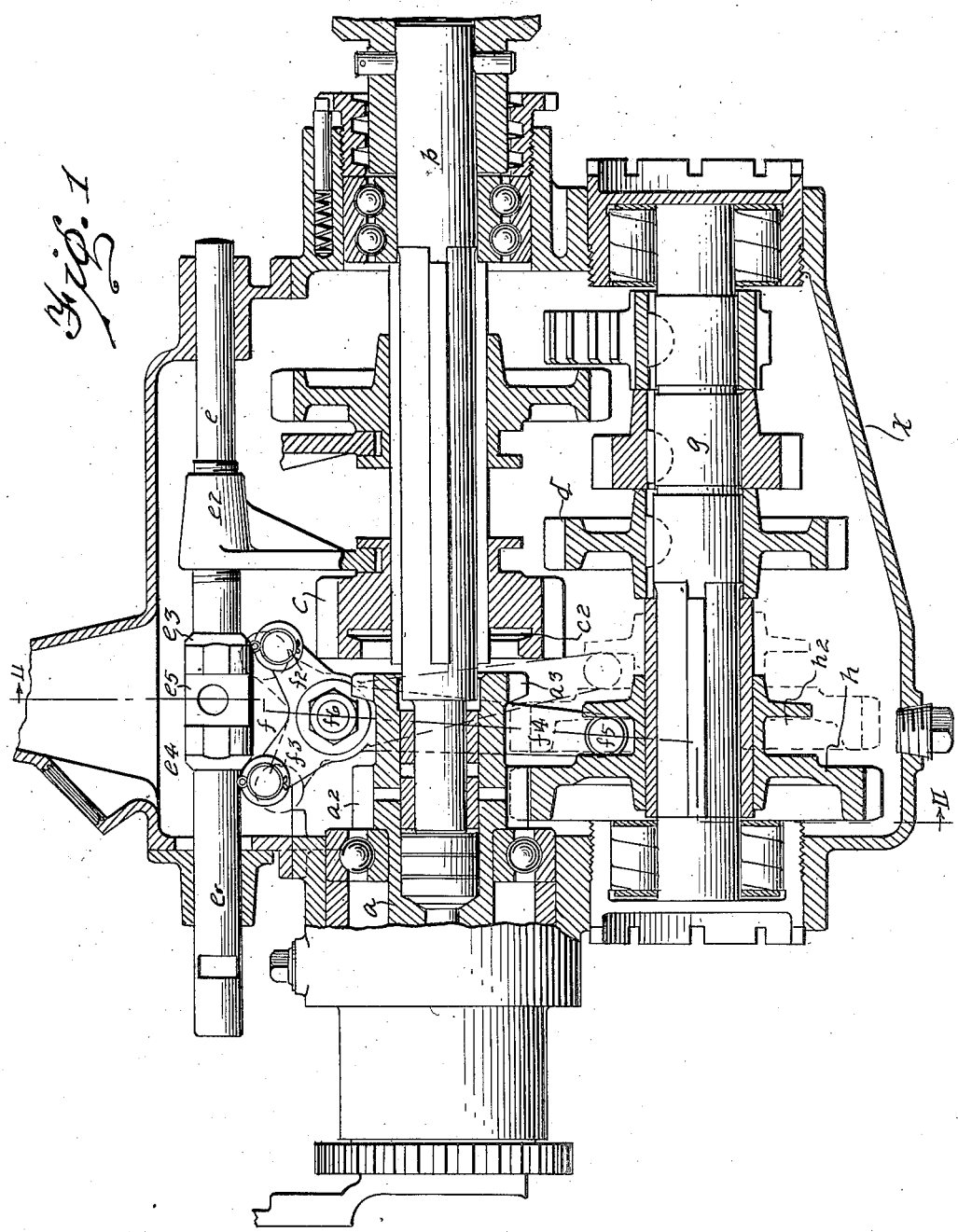
Figure 1 is a sectional elevation of a transmission gearing embodying my invention.

$a$ is the power imparting shaft and $b$ is the shaft to which the power from the shaft $a$ is imparted. These shafts are co-axial as in the usual construction and there is the usual gear wheels for forming parts of trains of gearing intermediate said shafts.

$g$ is the secondary shaft.

$a^2$ is a gear wheel on the power shaft $a$. $h$ is a gear wheel slidably keyed upon the shaft $g$ and adapted when engaged to receive its motion from the gear wheel $a^2$. $d$ is a gear wheel keyed upon the secondary shaft $g$. $c$ is a gear wheel slidably keyed upon the shaft $b$. $a^3$ is a clutch section upon the end of the shaft $a$, and $c^2$ is the complementary clutch section formed in the gear wheel $c$. $e$ is the shifter rod which is of the usual construction and carries the arm $e^2$, engaging an annular groove in the gear wheel $c$ whereby said gear wheel is shifted to engage the gear wheel $d$ or to be disengaged therefrom and have its clutch section engage the clutch section $a^3$ on the power shaft $a$ so as to directly connect the shafts $a$ and $b$.

The gear wheel $h$ may be slid along the shaft $g$ to one position in which its teeth engage the teeth of the gear wheel $a^2$ and to another position in which its teeth are disengaged. $h^2$ is the usual annular groove by which the gear wheel $h$ may be shifted along the shaft $g$. $f$ is a three-arm lever pivoted upon a stationary arbor $f^5$, and having an arm $f^4$ extending downward and engaging at $f^5$ in the groove $h^2$ of the gear wheel $h$ so that the rocking of the lever $f$ shall shift the gear wheel $h$ along the shaft $g$. $f^2$ is a second arm of the lever $f$, and $f^3$ is a third arm. The arms $f^2$ and $f^3$ are provided with friction rollers at their outer ends.

Upon the shifting rod $e$ I place a cam piece $e^5$ having opposite cam faces $e^3$ and $e^4$. The cam piece $e^5$ is located between the outer ends of the lever arms $f^2$ and $f^3$ so that its cam faces may engage the friction rollers on the ends of said arms. The relative arrangement of the cam piece $e^5$ and the outer ends of the arms $f^2$ and $f^3$ is such that when the shifting rod $e$ is moved to disengage the clutch portion $c^2$ from the clutch portion $a^3$, the arm $f^2$ will be pressed down by the cam surface $e^3$ and held in its lower position by the cam piece $e^5$. This will turn arm $f^4$ to the left as shown in Fig. 1, moving the gear wheel $h$ into engagement with the gear wheel $a^2$ so that the motion from the power shaft shall be transmitted to the secondary shaft $g$. When the rod $e$ is shifted toward the left as shown in dotted lines Fig. 1, the cam face $e^4$ will press the arm $f^3$ to the left and downward and the cam piece $e^5$ will hold it in its depressed position. This motion also carries the cam piece $e^5$ from its position over the arm $f^2$ so that the latter is free to rise. This motion of the shifting rod $e$ turns the arm $f^4$ toward the right, as shown in Fig. 1, carrying the gear wheel $h$ out of engagement with the gear wheel $h^2$ and at the same time moving the gear wheel $c$ to the left until its clutch portion engages the clutch portion $a^3$ on the power shaft, thus completing the direct connection.

It will be seen that when the direct connection is made the gear wheels are disengaged and at rest, while, when the direct connection is broken, the usual provision for transmitting different speeds between the shafts $a$ and $b$ is in operative arrangement.

What I claim is:

1. In an apparatus of the kind described, the combination of a power shaft and a power receiving shaft and a secondary shaft, a clutch adapted to directly engage said power shaft and said power receiving shaft, a shifting rod adapted to actuate said clutch, a gear wheel on said power shaft, a gear wheel slidably keyed on said secondary shaft, a pivoted lever shiftably engaging the gear wheel on the secondary shaft, two arms extending from said lever with their ends adjacent to said shifting rod and a cam piece on said shifting rod adapted to engage each of said arms and overrun the same substantially as and for the purpose described.

2. In an apparatus of the kind described, the combination of a power shaft, a power receiving shaft and a secondary shaft, a clutch adapted to directly engage and to disengage said power shaft and said power receiving shaft, means for actuating said clutch, a gear wheel on said power shaft, a gear wheel slidably keyed on said secondary shaft, means for engaging and disengaging said gear wheels, a gear wheel on the power receiving shaft, a second gear wheel on the secondary shaft, a positively acting cam apparatus between the clutch actuating means and the means for engaging the first-mentioned pair of gear wheels whereby said gear wheels are engaged when the clutch is disengaged and are disengaged when the clutch is engaged, said cam apparatus being constructed to allow said clutch actuating means to connect and disconnect the gear wheel on the power receiving shaft and the gear wheel on the secondary shaft when the power shaft and secondary shaft are engaged.

3. In an apparatus of the kind described, the combination of a power shaft, a power receiving shaft and a secondary shaft, a clutch adapted to directly engage and to disengage said power shaft and said power receiving shaft, means for actuating said clutch, a gear wheel on said power shaft, a gear wheel slidably keyed on said secondary shaft, means for engaging and disengaging said gear wheels, a gear wheel on the power receiving shaft, a second gear wheel on the secondary shaft, a shifting rod adapted to actuate said clutch actuating means, said shifting rod being provided with a positively acting cam adapted to actuate the means for engaging and disengaging the first-mentioned pair of gear wheels whereby the same are engaged when the clutch is disengaged and are disengaged when the clutch is engaged, said cam being constructed to allow said shifting rod to connect and disconnect the gear wheel on the power receiving shaft and the gear wheel on the secondary shaft when the power shaft and secondary shaft are engaged while maintaining its positive action.

In testimony whereof, I sign this specification.

HORACE T. THOMAS.